(12) United States Patent
Iizuka

(10) Patent No.: US 12,172,469 B2
(45) Date of Patent: Dec. 24, 2024

(54) PNEUMATIC TIRE

(71) Applicant: THE YOKOHAMA RUBBER CO., LTD, Tokyo (JP)

(72) Inventor: Miyuki Iizuka, Tokyo (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 735 days.

(21) Appl. No.: 16/942,618

(22) Filed: Jul. 29, 2020

(65) Prior Publication Data

US 2021/0031567 A1 Feb. 4, 2021

(30) Foreign Application Priority Data

Jul. 30, 2019 (JP) ................. 2019-139616

(51) Int. Cl.
| | |
|---|---|
| *B60C 11/03* | (2006.01) |
| *B60C 1/00* | (2006.01) |
| *B60C 11/12* | (2006.01) |
| *C08L 9/06* | (2006.01) |

(52) U.S. Cl.
CPC ........ *B60C 11/0304* (2013.01); *B60C 1/0016* (2013.01); *B60C 11/0302* (2013.01); *B60C 11/0306* (2013.01); *B60C 11/1204* (2013.01); *B60C 11/1236* (2013.01); *C08L 9/06* (2013.01); *B60C 2011/1213* (2013.01); *C08L 2205/025* (2013.01)

(58) Field of Classification Search
CPC ............... B60C 11/0304; B60C 1/0016; B60C 11/0302; B60C 11/1204; B60C 11/1236; B60C 2011/1213; B60C 11/00; B60C 2011/0025; C08L 9/06; C08L 2205/025; C08F 36/06; C08K 3/013; C08K 5/00
See application file for complete search history.

(56) References Cited

U.S. PATENT DOCUMENTS

| | | | |
|---|---|---|---|
| 2015/0239296 A1* | 8/2015 | Fukuda | ............... B60C 11/0041 152/209.5 |
| 2018/0290490 A1* | 10/2018 | Mashita | ................. B60C 1/0041 |
| 2018/0345734 A1* | 12/2018 | Mori | .................... B60C 11/1236 |
| 2019/0308451 A1* | 10/2019 | Pichereau | ............. B60C 1/0016 |
| 2021/0023882 A1* | 1/2021 | Miyazaki | ................ C08L 15/00 |

FOREIGN PATENT DOCUMENTS

| | | | | |
|---|---|---|---|---|
| JP | 2009091498 A | | 4/2009 | |
| WO | 2017211823 | * | 12/2017 | ............... B60C 1/00 |

* cited by examiner

*Primary Examiner* — Alison L Hindenlang
*Assistant Examiner* — Shibin Liang
(74) *Attorney, Agent, or Firm* — Global IP Counselors, LLP

(57) ABSTRACT

A pneumatic tire includes a tread portion including a rubber composition including a diene rubber including styrene-butadiene rubber (SBR) and butadiene rubber (BR), and a filler. The styrene-butadiene rubber (SBR) includes emulsion-polymerized styrene-butadiene rubber (E-SBR) by an amount of 40 mass % or greater in the diene rubber. A ratio of a blended amount of the styrene-butadiene rubber (SBR) to a blended amount of the butadiene rubber (BR) is from 1.0 to 1.3, and the filler includes 70 parts by mass or greater of silica with respect to 100 parts by mass of the diene rubber.

17 Claims, 4 Drawing Sheets

PNEUMATIC TIRE

CROSS-REFERENCE TO RELATED APPLICATION

This application claims priority to Japanese Patent Application No. 2019-139616, filed Jul. 30, 2019, the contents of which are hereby incorporated herein by reference in their entirety.

BACKGROUND

Field of the Invention

The present invention relates to a pneumatic tire.

Background Information

An all-season pneumatic tire (hereinafter referred to as an all-season tire) is regarded as an intermediate tire between a regular so-called "summer tire" used during a non-snow season and a snow tire referred to as a winter tire and is widely used in North America and Europe. This all-season tire is required to have excellent steering stability in snow-covered road surfaces and wet road surfaces, and is further required to have high wear resistance performance in these areas.

In the related art, to enhance steering stability in wet road surfaces, as a filler to be blended with tread rubber, a blended amount of silica is increased instead of carbon black. However, there is a problem of degradation of wear resistance due to such a change in the blended amount.

In addition, to enhance adhesion to snow-covered road surfaces, the composition of rubber of a tread is adjusted to soften the hardness of the rubber, but softening of the rubber degrades steering stability and wear resistance in dry road surfaces.

For example, JP 2009-91498 A proposes a rubber composition in which silica is blended with terminal-modified styrene-butadiene rubber of which a terminal is modified with polyorganosiloxane or the like to improve affinity between rubber and silica and obtain a tire that provides excellent wear resistance and wet grip.

All-season tires are required to have a high level of steering stability in snow-covered road surfaces and wet road surfaces and of wear resistance, and further improvement of these characteristics is required.

An object embodiment of the present invention is to provide a pneumatic tire that excellent steering stability in snow-covered road surfaces and wet road surfaces and has excellent wear resistance.

An aspect of an embodiment of the present disclosure is a pneumatic tire, including a tread portion made of a rubber composition including a diene rubber including styrene-butadiene rubber (SBR) and butadiene rubber (BR), and a filler, the styrene-butadiene rubber (SBR) including emulsion-polymerized styrene-butadiene rubber (E-SBR) by an amount of 40 mass % or greater in the diene rubber, a ratio of a blended amount of the styrene-butadiene rubber (SBR) to a blended amount of the butadiene rubber (BR) being from 1.0 to 1.3, and the filler including 70 parts by mass or greater of silica with respect to 100 parts by mass of the diene rubber.

Preferably, the filler is provided in an amount of 80 parts by mass or greater with respect to 100 parts by mass of the diene rubber, the filler further includes carbon black, and a ratio of a blended amount of the carbon black to a blended amount of the filler is 15% or greater.

The rubber composition preferably includes 10 parts by mass or greater of naphthene oil with respect to 100 parts by mass of the diene rubber.

In the rubber composition, a tan δ (−20° C.) at −20° C. after vulcanization, a tan δ (20° C.) at 20° C. after vulcanization, and a storage modulus E' (20° C.) at 20° C. after vulcanization preferably satisfy {tan δ (−20° C.)−tan δ (20° C.)}/E' (20° C.)<0.01. Tan δ means the tan δ determined according to the dynamic visco-elasticity test specified in JIS K6394, and storage modulus E' means the storage modulus E' determined according to the dynamic visco-elasticity test specified in JIS K6394.

Preferably, the tread portion includes a tread pattern in a surface to come into contact with a road surface, the tread pattern includes a pair of circumferential main grooves formed of an inner circumferential main groove disposed in a half-tread region on one side in a tire lateral direction with respect to a tire equator line, and an outer circumferential main groove disposed outward in the tire lateral direction with respect to the inner circumferential main groove, and a plurality of sipes disposed at intervals in a tire circumferential direction in regions defined by the pair of circumferential main grooves, the plurality of sipes extending in the regions at an incline with respect to the tire lateral direction, and connecting the pair of circumferential main grooves, each of the plurality of sipes includes an inner inclined portion disposed inside the region, and both-side inclined portions disposed on both sides of the inner inclined portion in the tire lateral direction, and an inclination angle of the inner inclined portion with respect to the tire lateral direction is greater than an inclination angle of the both-side inclined portions with respect to the tire lateral direction.

Preferably, the tread portion includes a tread pattern in a surface to come into contact with a road surface, the tread pattern includes a pair of circumferential main grooves formed of an inner circumferential main groove disposed in a half-tread region on one side in the tire lateral direction with respect to the tire equator line and an outer circumferential main groove disposed outward in the tire lateral direction with respect to the inner circumferential main groove, and the outer circumferential main groove has a groove width greater than a groove width of the inner circumferential main groove.

A pneumatic tire of the above-described aspect provides excellent steering stability in snow-covered road surfaces and wet road surfaces, and provides excellent wear resistance.

DESCRIPTION OF EMBODIMENTS

A pneumatic tire according to embodiments of the present invention will be described below in detail with reference to the accompanying drawings.

The pneumatic tire of the embodiments described below is, for example, applied to an all-season tire for a passenger vehicle, but can also be applied to an all-season tire for a light truck, or an all-season tire for a bus or a truck.

Herein, "tire lateral direction" is the direction parallel with the rotation axis of the pneumatic tire. "Outward in the tire lateral direction" is the direction in the tire lateral direction away from a tire equator line CL that represents the tire equatorial plane with respect to the position of comparison. In addition, "inward in the tire lateral direction" is the direction in the tire lateral direction toward the tire equator line CL with respect to the position of comparison. "Tire circumferential direction" is the direction in which the pneumatic tire rotates about the rotation axis of the pneumatic tire. The tire circumferential direction includes a first side and a second side that differ in the direction from each other. "Tire radial direction" is the direction orthogonal to the rotation axis of the pneumatic tire. "Outward in the tire radial direction" is the direction away from the rotation axis along the tire radial direction with respect to the position of comparison. "Inward in the tire radial direction" is the direction toward the rotation axis along the tire radial direction with respect to the position of comparison.

Tire Structure

Figure 1:
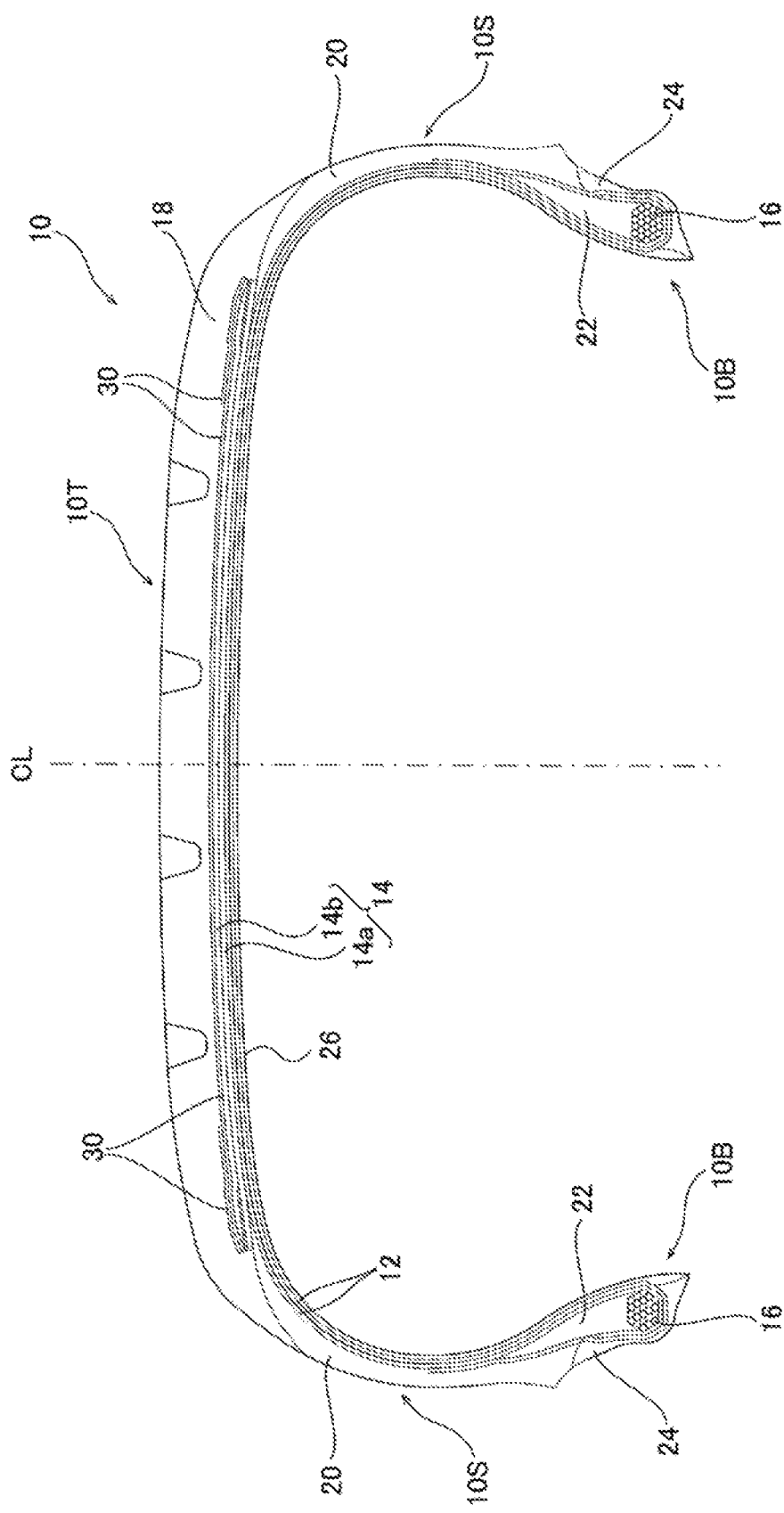
FIG. 1 is a tire cross-sectional view of a tire according to an embodiment.

FIG. 1 is a tire cross-sectional view of a tire 10 according to an embodiment. The tire 10 includes a tread portion 10T including a tread pattern, a pair of bead portions 10B, and a pair of side portions 10S provided on both sides of the tread portion 10T and connecting the pair of bead portions 10B with the tread portion 10T.

The tire 10 includes a carcass ply layer 12, a belt layer 14, and bead cores 16 as framework members or layers of framework members and mainly includes a tread rubber member 18, side rubber members 20, bead filler rubber members 22, rim cushion rubber members 24, and an innerliner rubber member 26 around the framework members.

The carcass ply layer 12 is composed of a carcass ply member that is made of organic fibers coated with rubber and that is wound between a pair of the annular bead cores 16 and formed into a toroidal shape. The carcass ply member is wound around the bead cores 16 and extends outward in the tire radial direction. The belt layer 14 is disposed outward of the carcass ply layer 12 in the tire radial direction and is composed of two belt members 14a and 14b. The belt layer 14 is a member made of steel cords that are coated with rubber and that are disposed inclined at a predetermined angle of, for example, from 20 to 30 degrees with respect to the tire circumferential direction. A width in the tire lateral direction of the lower layer belt member 14a is greater than that of the upper layer belt member 14b. The steel cords of the two belt members 14a and 14b are inclined in opposite directions. Accordingly, the belt members 14a and 14b are crossing layers configured to suppress expansion of the carcass ply layer 12 due to inflation air pressure.

The tread rubber member 18 is disposed outward of the belt layer 14 in the tire radial direction. The side rubber members 20 are connected to both end portions of the tread rubber member 18, and form the side portions 10S. The rim cushion rubber members 24 are respectively disposed at the inner ends of the side rubber members 20 in the tire radial direction and contact a rim on which the tire 10 is mountable. The bead filler rubber members 22 are disposed outward of the bead cores 16 in the tire radial direction. Thus, each of the bead filler rubber members 22 is sandwiched between a portion of the carcass ply layer 12 before being wound around the bead core 16 and a portion of the carcass ply layer 12 after being wound around the bead core 16. The innerliner rubber member 26 is provided in an inner surface of the tire 10 facing a tire cavity region that is filled with air and is surrounded by the tire 10 and the rim.

In addition, the tire 10 includes two belt cover layers 30 that cover the belt layer 14 from outward of the belt layer 14 in the tire radial direction and that are made of organic fibers or steel cords coated with rubber. Additionally, the tire 10 may include a bead stiffener between the carcass ply layer 12 wound around the bead core 16 and the bead filler rubber member 22.

The tire structure of the present embodiment is as described above. However, the tire structure is not particularly limited and a known tire structure is applicable.

Rubber Composition of Tread Portion

The tread rubber member 18 constituting the tread portion 10T is formed by vulcanizing a rubber composition described below. The rubber composition includes a diene rubber and a filler. The diene rubber includes a styrene-butadiene rubber (SBR) and a butadiene rubber (BR). The styrene-butadiene rubber (SBR) includes emulsion-polymerized styrene-butadiene rubber (E-SBR) by an amount of 40 mass % or greater in the diene rubber. The emulsion-polymerized styrene-butadiene rubber (E-SBR) has a relatively large molecular weight, and improves wear resistance when the emulsion-polymerized styrene-butadiene rubber is provided by the above-described blended amount.

As described below, the rubber composition of the present embodiment includes 70 parts by mass or greater of silica with respect to 100 parts by mass of the diene rubber, and thus is disadvantageous in wear resistance, but the rubber composition of the present embodiment includes the emulsion-polymerized styrene-butadiene rubber (E-SBR) by an amount of 40 mass % or greater in the diene rubber, and thus can suppress reduction in wear resistance. In addition, since the rubber composition includes the emulsion-polymerized styrene-butadiene rubber (E-SBR) by an amount of 40 mass % or greater in the diene rubber, improvement of the steering stability in snow-covered road surfaces (hereinafter referred to as performance on snow) and the steering stability in wet road surfaces (hereinafter referred to as wet performance) in a well-balanced manner can be obtained. In particular, since the emulsion-polymerized styrene-butadiene rubber (E-SBR) is provided by the above-described blended amount, the temperature dependency of a tan δ can be decreased. Tan δ means the tan δ determined according to the dynamic visco-elasticity test specified in JIS K6394.

When the blended amount of the emulsion-polymerized styrene-butadiene rubber (E-SBR) is less than 40 mass % in the diene rubber, the improvement of the wear resistance is decreased, and thus the reduction of the wear resistance due to the increase of the blending amount of silica is not achieved. In addition, when the blended amount of the emulsion-polymerized styrene-butadiene rubber (E-SBR) is less than 40 mass % in the diene rubber, the improvement of the performance on snow and the improvement of the wet performance in a well-balanced manner cannot be obtained. In particular, when the blended amount of the emulsion-polymerized styrene-butadiene rubber (E-SBR) is less than 40 parts by mass in the diene rubber, the temperature dependency of a tan δ cannot be decreased. For example, when 40 mass % or greater of a solution-polymerized styrene-butadiene rubber (modified S-SBR) having a modified molecular chain terminal is blended in the diene rubber as the styrene-butadiene rubber (SBR) instead of the emulsion-polymerized styrene-butadiene rubber (E-SBR), the local inclination of a tan δ curve representing the temperature change of a tan δ increases. That is, the temperature dependency of a tan δ increases.

Accordingly, the blended amount of the emulsion-polymerized styrene-butadiene rubber (E-SBR) in the diene rubber is preferably 45 mass % or greater, and more preferably 50 mass % or greater.

On the other hand, when the blended amount of the emulsion-polymerized styrene-butadiene rubber (E-SBR) is too large, the blended amount of the butadiene rubber (BR) is small, and a SBR/BR ratio described below exceeds 1.3. Due to this ratio, it is difficult to improve wear resistance. In addition, the flexibility of the tread rubber member is insufficient, and it is difficult to improve performance on snow. Accordingly, the blended amount of the emulsion-polymerized styrene-butadiene rubber (E-SBR) is preferably 56.5 mass % or less in the diene rubber.

The emulsion-polymerized styrene-butadiene rubber (E-SBR) is not particularly limited as long as the emulsion-polymerized styrene-butadiene rubber (E-SBR) is a styrene-butadiene rubber manufactured by emulsion polymerization.

The weight average molecular weight of the emulsion-polymerized styrene-butadiene rubber (E-SBR) is preferably from 500,000 to 1,000,000 from the perspective of improving wear resistance. The weight average molecular weight is a molecular weight (calibrated with polystyrene) measured by gel permeation chromatography (GPC).

The styrene content of the emulsion-polymerized styrene-butadiene rubber (E-SBR) is preferably from 15 to 40 mass %, and more preferably from 20 to 30 mass % from the perspective of improving performance on snow and wet performance in a well-balanced manner. The styrene content is measured by infrared spectroscopy (Hampton method).

The glass transition temperature (Tg) of the emulsion-polymerized styrene-butadiene rubber (E-SBR) is preferably from −65 to −30° C., and more preferably from −60 to −40° C. from the perspective of improving performance on snow. The glass transition temperature (Tg) is determined as a temperature at a midpoint of a transition region by measuring a thermogram at a temperature elevation speed of 20° C./min by differential scanning calorimetry (DSC). When the styrene-butadiene rubber is an oil extended product, the glass transition temperature is the glass transition temperature of the styrene-butadiene rubber including no oil-extending component (oil).

The butadiene rubber (BR) may be butadiene rubber that is normally used in a rubber composition for a tire tread.

A ratio of the blended amount of the styrene-butadiene rubber (SBR) to the blended amount of the butadiene rubber (BR) (hereinafter may be referred to as an SBR/BR ratio) is from 1.0 to 1.3. When the SBR/BR ratio satisfies this range, it becomes easy to make {tan δ (−20° C.)−tan δ (20° C.)}/E' (20° C.) described below less than 0.01, and it is easy to decrease the temperature dependency of a tan δ while maintaining the rubber hardness of the rubber composition after vulcanization at a certain level or higher. When the SBR/BR ratio is less than 1.0, the local inclination of a tan δ curve decreases and the temperature dependency of a tan δ decreases, but wet performance easily reduces. On the other hand, when the SBR/BR ratio exceeds 1.3, it is difficult to make {tan δ (−20° C.)−tan δ (20° C.)}/E' (20° C.) less than 0.01.

The diene rubber can include, in addition to the butadiene rubber (BR) and the styrene-butadiene rubber (SBR), other rubber such as solution-polymerized styrene-butadiene rubber (S-SBR) and natural rubber (NR). Such other rubber can be blended within the range where the above-described blended amount of the emulsion-polymerized styrene-butadiene rubber (E-SBR) and the above-described range of the SBR/BR ratio are satisfied, but the blended amount of other rubber is preferably small. In the diene rubber, other rubber is preferably provided by an amount of 15 mass % or less, more preferably 10 mass % or less, and even more preferably substantially free or 0 mass %. In the present specification, "substantially free" means that it can be inevitably blended as a trace mount of a component.

The filler includes 70 parts by mass or greater of silica with respect to 100 parts by mass of the diene rubber. Thus, wet performance improves. When the blended amount of the silica is less than 70 parts by mass, it is difficult to improve wet performance and to satisfy the requirements for an all-season tire. In addition, when the blended amount of the silica is 70 parts by mass or greater, due to a change in the tensile properties of the vulcanized rubber composition, followability to a road surface improves and handling performance improves.

The silica can be any silica that is normally blended in a rubber composition for a tire tread, and for example, wet method silica, dry method silica, surface treated silica and the like can be used. The CTAB specific surface area of the silica determined according to JIS K6217-3 is preferably from 140 to 184 m$^2$/g from the perspective of suppressing the degradation of workability while ensuring the dispersibility of the silica.

The rubber composition preferably includes a silane coupling agent in order to improve the dispersibility of the silica and ensure wet performance. The blended amount of the silane coupling agent is preferably from 3 to 15 parts by mass, and more preferably from 5 to 10 parts by mass with respect to 100 parts by mass of the diene rubber.

The silane coupling agent is not particularly limited, but is preferably a sulfur-containing silane coupling agent. For example, bis-(3-triethoxysilylpropyl)tetrasulfide, bis-(3-triethoxysilylpropyl)disulfide, 3-trimethoxysilylpropyl benzothiazole tetrasulfide, γ-mercaptopropyltriethoxysilane, 3-octanoylthiopropyltriethoxysilane, and the like can be used.

The filler is preferably provided in an amount of 80 parts by mass or greater with respect to 100 parts by mass of the diene rubber. At this time, according to an embodiment, preferably, the filler further includes carbon black, and a ratio of the blended amount of the carbon black to the blended amount of the filler (hereinafter referred to as a CB ratio) is 15% or greater. When the CB ratio is 15% or greater, the rigidity of the rubber composition after vulcanization is ensured, and steering stability on dry road surfaces and wet road surfaces is ensured, while wear resistance is improved. The CB ratio is preferably 18% or greater. On the other hand, when the CB ratio is too high, the blended amount of silica becomes insufficient, and the effect of improving wet performance easily decreases. Accordingly, the CB ratio is preferably 40% or less, and more preferably 30% or less.

The blended amount of the filler is preferably 85 parts by mass or greater, and more preferably 90 parts by mass or greater with respect to 100 parts by mass of the diene rubber. On the other hand, when the blended amount of the filler is too large, workability easily degrades. Accordingly, the blended amount of the filler is preferably 120 parts by mass or less, and more preferably 110 parts by mass or less with respect to 100 parts by mass of the diene rubber.

According to an embodiment, the rubber composition preferably further includes 10 parts by mass or greater of naphthene oil with respect to 100 parts by mass of the diene rubber. Thus, miscibility with the diene rubber is adjusted, and viscoelastic characteristics are easily made suitable, and the effect of improving performance on snow and wet performance in a well-balanced manner increases. The blended amount of the naphthene oil is preferably 10 parts by mass or greater, and more preferably 15 parts by mass or greater with respect to 100 parts by mass of the diene rubber. On the other hand, the blended amount of the naphthene oil is preferably 30 parts by mass or less, and more preferably 25 parts by mass or less with respect to 100 parts by mass of the diene rubber.

According to an embodiment, preferably, in the rubber composition, a tan δ (−20° C.) at −20° C. after vulcanization, a tan δ (20° C.) at 20° C. after vulcanization, and a storage modulus E' (20° C.) at 20° C. after vulcanization satisfy {tan δ (−20° C.)−tan δ (20° C.)}/E' (20° C.)<0.01. Satisfying the above-described relationship formula, the temperature dependency of a tan δ decreases while keeping the rubber hardness of the rubber composition after vulcanization at a certain level or higher, and the improvement of the performance on snow and the improvement of the wet performance in a well-balanced manner increases. When the rubber hardness is kept at a certain level or higher, a running vehicle is less likely to wobble, and the degradation of steering stability is suppressed. When the value of the above-described {tan δ (−20° C.)−tan δ (20° C.)}/E' (20° C.) is 0.01 or greater, the effect of decreasing the temperature dependency of a tan δ while keeping the rubber hardness of the rubber composition after vulcanization at a certain level or higher decreases. Accordingly, it is difficult to improve the performance on snow and the wet performance in a well-balanced manner. The above-described relationship formula is easily satisfied, for example, when the blended amount of the emulsion-polymerized styrene-butadiene rubber (E-SBR) is 40 mass % or greater in the diene rubber. When the solution-polymerized styrene-butadiene rubber (S-SBR) is used instead of the emulsion-polymerized styrene-butadiene rubber (E-SBR), it is difficult to satisfy the above-described relationship formula. The value of the above-described {tan δ (−20° C.)−tan δ (20° C.)}/E' (20° C.) is preferably less than 0.009, and more preferably less than 0.008. On the other hand, the value of the above-described indicator is preferably 0.003 or greater.

The rubber composition can further include various compounding agents that are commonly used in a rubber composition for a tire tread within the range where the effect of embodiments of the present invention is not impaired. Examples of the compounding agents include a vulcanization or crosslinking agent, a vulcanization accelerator, an anti-aging agent, a plasticizer, a processing aid, and a thermoplastic resin such as a liquid polymer and a terpene resin. Among these, since the temperature dependency of a tan δ increases, the blended amount of the thermoplastic resin is preferably 5 mass % or less, and more preferably substantially free or 0 mass % in the diene rubber.

The rubber composition described above can be manufactured by mixing the above-described components by using a well-known rubber kneading machine such as a Banbury mixer, a kneader, a roll mill, or the like.

The tire 1 including the tread rubber member obtained by vulcanizing the rubber composition of the present embodiment in the tread portion 10T provides excellent steering stability in snow-covered road surfaces and wet road surfaces and provides excellent wear resistance.

Tread Pattern

Figure 2:
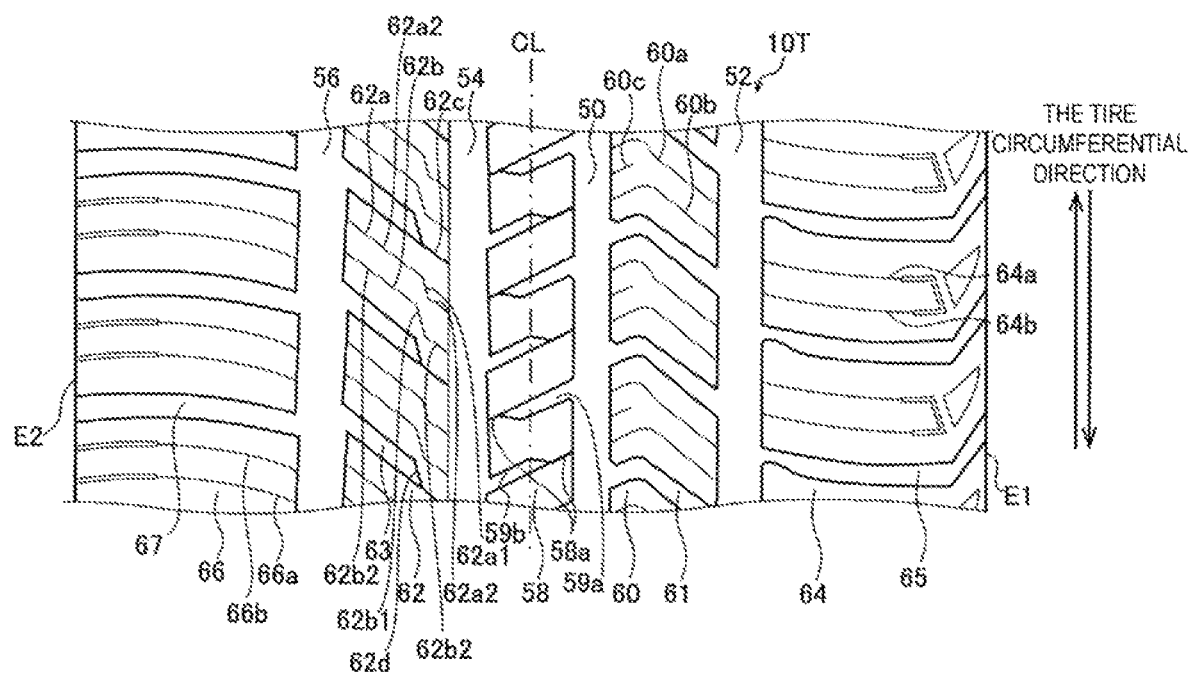
FIG. 2 is an explanatory view of a tread pattern according to an embodiment.

FIG. 2 is an explanatory view of an example of a tread pattern according to the present embodiment. The tread pattern illustrated in FIG. 2 and described below is an asymmetric pattern with respect to the tire equator line CL, but is not necessarily an asymmetrical pattern. For example, the tread pattern can be a point symmetrical pattern that is a combination of a tread pattern on the right of an inner circumferential main groove 54 in FIG. 2, and a tread pattern where, of the tread pattern, a portion outward from an inner circumferential main groove 50 in the tire lateral direction is rotated 180 degrees on the plane of FIG. 2 (rotated such that the upward direction becomes the downward direction) and is disposed on the left of the inner circumferential main groove 54 that is at the left of the tire equator line CL.

As illustrated in FIG. 2, the tread pattern of the tread portion 10T mainly includes the inner circumferential main grooves 50 and 54, outer circumferential main grooves 52 and 56, a center continuous land portion 58, an intermediate block land portion 60, an intermediate continuous land portion 62, side land portions 64 and 66, and lug grooves 59a, 59b, 61, 63, 65 and 67.

The tread portion 10T includes, at both sides in the tire lateral direction from the tire equator line (tire centerline) CL, the intermediate block land portion 60 defined in the tire lateral direction by the inner circumferential main groove 50 and the outer circumferential main groove 52, and the intermediate continuous land portion 62 defined in the tire lateral direction by the inner circumferential main groove 54 and the outer circumferential main groove 56. Further, the tread portion 10T includes the side land portions 64 and 66 that come in contact with the outer circumferential main grooves 52 and 56, and are formed outward of the outer circumferential main grooves 52 and 56 in the tire lateral direction, and that include ground contact ends of the pneumatic tire 10 in a region.

The inner circumferential main grooves 50 and 54 are located further inward (side of the tire equator line CL) than the outer circumferential main grooves 52 and 56 in the tire lateral direction, and are disposed in contact with the center continuous land portion 58 to define the center continuous land portion 58.

The outer circumferential main grooves 52 and 56 are located further outward than the inner circumferential main grooves 50 and 54 in the tire lateral direction, and are disposed in contact with the intermediate block land portion 60 and the intermediate continuous land portion 62 such that the outer circumferential main grooves 52 and 56 together with the inner circumferential main grooves 50 and 54 define the intermediate block land portion 60 and the intermediate continuous land portion 62.

The intermediate block land portion 60 is defined in the tire circumferential direction by the lug grooves 61 to form a plurality of blocks.

Specifically, the center continuous land portion 58, the lug grooves 59a (first center lug grooves), and the lug grooves 59b (second center lug grooves) are disposed between the inner circumferential main groove 50 (first inner circumferential main groove) and the inner circumferential main groove 54 (second inner circumferential main groove). Hereinafter, the lug grooves 59a and 59b are referred to as center lug grooves 59a and 59b.

The center continuous land portion 58 is a continuous land portion that extends around once in the tire circumferential direction, and that is defined by the inner circumferential main groove 50 and the inner circumferential main groove 54. The center lug grooves 59a extend from the inner circumferential main groove 50 inward in the tire lateral direction and terminate within the region of the center continuous land portion 58. The center lug grooves 59b extend from the inner circumferential main groove 54 inward in the tire lateral direction and terminate within the region of the center continuous land portion 58. A plurality of the center lug grooves 59a and the center lug grooves 59b are disposed at intervals in the tire circumferential direction. One center lug groove 59b is disposed in the region in the tire circumferential direction between two center lug grooves 59a adjacent in the tire circumferential direction, and one center lug groove 59a is disposed in the region in the tire circumferential direction between two center lug grooves 59b adjacent in the tire circumferential direction. In other words, the lug grooves 59a extending from the inner circumferential main groove 50 and the lug grooves 59b extending from the inner circumferential main groove 54 are alternately disposed along the tire circumferential direction.

Sipes 58a that communicate terminating ends of the center lug grooves 59a with the inner circumferential main groove 54 or that communicate terminating ends of the center lug grooves 59b with the inner circumferential main groove 50 are disposed in the region of the center continuous land portion 58.

In FIG. 2, the intermediate block land portions 60 and the lug grooves 61 are disposed between the inner circumferential main groove 50 (first inner circumferential main groove) and the outer circumferential main groove 54 (first outer circumferential main groove) disposed in a half-tread region at the right of the tire equator line CL.

A plurality of the lug grooves 61 are disposed at predetermined intervals in the tire circumferential direction.

A plurality of the intermediate block land portions 60 are disposed in rows in the tire circumferential direction and are defined in the tire lateral direction by the inner circumferential main groove 50 and the outer circumferential main groove 54, and are defined in the tire circumferential direction by the lug grooves 61.

Sipes 60a (first sipes) and sipes 60b (second sipes) that connect between the inner circumferential main groove 50 and the outer circumferential main groove 54 are disposed in the region of each of the intermediate block land portions 60.

Figure 3:
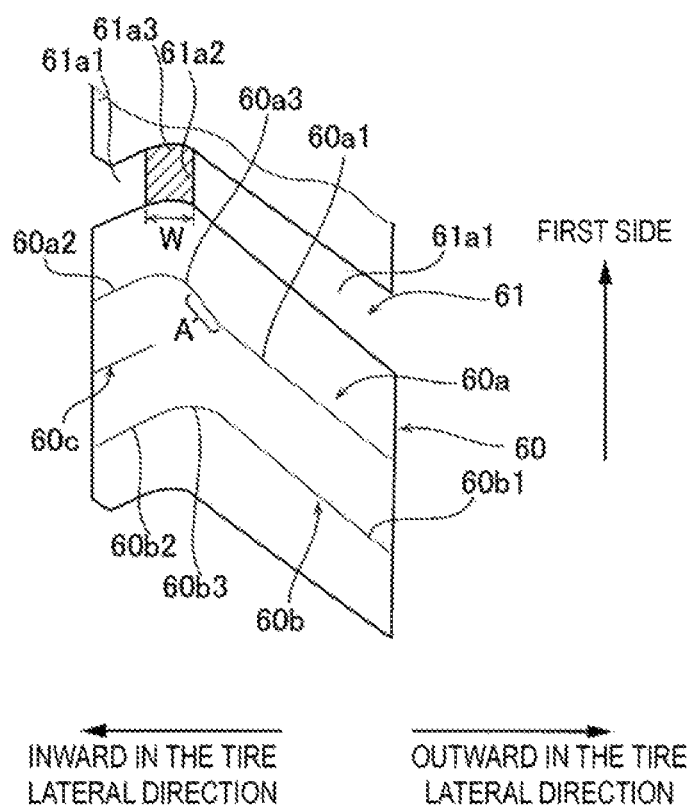
FIG. 3 is an enlarged explanatory detailed view of a block land portion and a lug groove illustrated in FIG. 2.

FIG. 3 is an enlarged explanatory detailed view of the intermediate block land portions 60 and the lug grooves 61 illustrated in FIG. 2.

Each of the lug grooves 61 defining the intermediate block land portions 60 in the tire circumferential direction includes a pair of inclined groove portions 61a1 and 61a1, and a groove turning portion 61a2. The pair of inclined groove portions 61a1 and 61a1 are portions that approach each other from the connection ends of the inner circumferential main groove 50 and the outer circumferential main groove 52 while extending toward a first side in the tire circumferential direction, and the groove turning portion 61a2 is a portion that bends connecting the ends of the pair of inclined groove portions 61a1 and 61a1 and projecting toward the first side in the tire circumferential direction. A groove raised bottom portion 61a3 having a groove depth that is less than the groove depth of the inclined groove portion 61a1 is partially disposed in the groove turning portion 61a2. In FIG. 3, the region of the groove raised bottom portion 61a3 is indicated by diagonal lines.

The sipes 60a are located at the first side in the tire circumferential direction relative to the sipes 60b.

Each of the sipes 60a includes a pair of inclined sipe portions 60a1 and 60a2 that approach each other from the connection ends of the inner circumferential main groove 50 and the outer circumferential main groove 52 while advancing toward the first side, and a sipe turning portion 60a3 that bends projecting toward the first side and that connects ends of the pair of inclined sipe portions 60a1 and 60a2.

Each of the sipes 60b also includes a pair of inclined sipe portions 60b1 and 60b2 that approach each other from the connection ends of the inner circumferential main groove 50 and the outer circumferential main groove 52 while advancing toward the first side, and a sipe turning portion 60b3 that bends projecting toward the first side and that connects the ends of the pair of inclined sipe portions 60b1 and 60b2.

Here, the position in the tire lateral direction of the projecting end of the sipe turning portion 60a3 of the sipe 60a is within the range of the raised bottom portion in the tire lateral direction in which the groove raised bottom portion 61a3 of the lug groove 61 is disposed, and is further inward in the tire lateral direction than the position of the sipe turning portion 60b3 of the sipe 60b in the tire lateral direction. In other words, the position in the tire lateral direction of the projecting end of the sipe turning portion 60a3 is within the range of the raised bottom portion of the groove raised bottom portion 61a3, and is further inward in the tire lateral direction than the position of the projecting end of the sipe turning portion 60b3 in the tire lateral direction.

The maximum sipe depth of the sipe 60a and the sipe 60b is less than 90% of the groove depth of the inner circumferential main groove 50 and the outer circumferential main groove 52.

Note that, as illustrated in FIG. 2, the position in the tire lateral direction of the projecting end of the groove turning portion 61a2 of the lug groove 61 connecting the inner circumferential main groove 50 and the outer circumferential main groove 52 is inward in the tire lateral direction with respect to the center line in the tire lateral direction of the intermediate block land portion 60, but can be on the center line in the tire lateral direction, or may be outward in the tire lateral direction. However, from the perspective of improving control performance on snow by increasing the edge effect of the inclined groove portion 61a1 located outward in the tire lateral direction, the position in the tire lateral direction of the projecting end of the groove turning portion 61a2 is preferably located inward in the tire lateral direction with respect to the center line in the tire lateral direction of the intermediate block land portion 60.

In FIG. 2, the intermediate continuous land portion 62 (continuous land portion) and the lug grooves 63 are disposed between the inner circumferential main groove 54 (second inner circumferential main groove) and the outer circumferential main groove 56 (second outer circumferential main groove) disposed in a half-tread region at the left of the tire equator line CL.

The intermediate continuous land portion 62 is a land portion that is defined by the inner circumferential main groove 54 and the outer circumferential main groove 56 and that extends around once in the tire circumferential direction.

Sipes 62a (fourth sipes) and sipes 62b (fifth sipes) that extend at an incline with respect to the tire lateral direction and connect the inner circumferential main groove 54 and the outer circumferential main groove 56 are disposed in the region of the intermediate continuous land portion 62.

The lug groove 63 extends from the outer circumferential main groove 56 to the inner circumferential main groove 54 and is terminated without communicating with the inner circumferential main groove 54. A plurality of the lug grooves 63 are disposed at a predetermined interval in the tire circumferential direction. Sipes 62c that connect the terminating ends of the lug grooves 63 and the inner circumferential main groove 54 are disposed in the region of the intermediate continuous land portion 62 from the terminating ends of the lug grooves 63.

The lug grooves 63 and the sipes 62a, 62b and 62c are all inclined with respect to the tire lateral direction. The direction of this inclination is toward a differing side in the tire circumferential direction from the tire lateral direction with respect to the inclination direction of the lug grooves 59a and 59b and the sipes 58a. Specifically, the lug grooves 63 and the sipes 62a, 62b and 62c extend toward a second side in the tire circumferential direction while advancing inward from outward in the tire lateral direction.

The sipes 62a and 62b include inner inclined portions 62a1 and 62b1 that are disposed inside the region of the intermediate land portion 62, and both-side inclined portions 62a2 and 62b2 that are disposed on both sides in the tire lateral direction of the inner inclined portions 62a1 and 62b1. "Inside the region" means the central portion in the tire lateral direction between the portions being in contact with the circumferential main grooves 54 and 56 on both sides of the intermediate land portion 62. The both-side inclined portions 62a2 and 62b2 connect to each of the inner circumferential main groove 54 and the outer circumferential main groove 56. The inclination angle of the inner inclined portions 62a1 and 62b1 with respect to the tire lateral direction is greater than the inclination angle of the both-side inclined portions 62a2 and 62b2 with respect to the tire lateral direction.

The side land portions 64 and 66 are respectively disposed outward of the outer circumferential main grooves 52 and 56 in the tire lateral direction and are respectively in contact with the outer circumferential main grooves 52 and 56. The side land portions 64 and 66 extend to reach tread pattern ends E1 and E2.

The lug groove 65 extends outward in the tire lateral direction from the outer circumferential main groove 52 to the pattern end E1. A plurality of the lug grooves 65 are disposed at a predetermined interval in the tire circumferential direction. In the region of the side land portion 64 that is between the lug grooves 65 adjacent to each other in the tire circumferential direction, sipes 64a and 64b are disposed so as to extend outwardly in the tire lateral direction from the outer circumferential main groove 52.

The lug groove 67 extends outward in the tire lateral direction from the outer circumferential main groove 56 to the pattern end E2. A plurality of the lug grooves 67 are disposed at a predetermined interval in the tire circumferential direction. In the region of the side land portion 66 that is between the lug grooves 67 adjacent to each other in the tire circumferential direction, sipes 66a and 66b are disposed so as to extend outwardly in the tire lateral direction from the outer circumferential main groove 56.

As described above, the sipes 60a and 60b are disposed in the intermediate block land portion 60 of the tread pattern. Accordingly, while performance on snow can be improved by the edge effect of the sipes 60a and 60b, the block rigidity of the intermediate block land portion 60 is reduced due to the inclusion of the sipes 60a and 60b. In particular, the groove turning portion 61a2 of the lug grooves 61 that define the intermediate block land portion 60 in the tire circumferential direction is a portion where strain tends to concentrate when the intermediate block land portion 60 deforms under lateral force or longitudinal force from a road surface, and is a portion that affects the magnitude of deformation of the intermediate block land portion 60. Accordingly, the groove raised bottom portion 61a3 is disposed in the groove turning portion 61a2, and thus the block rigidity of the intermediate block land portion 60 can be increased. In particular, the sipe turning portion 60a3 of the sipe 60a is disposed near the groove raised bottom portion 61a3 of the lug groove 61, or in other words, the projecting end of the sipe turning portion 60a3 is disposed within the range of a raised bottom portion in the tire lateral direction in which the groove raised bottom portion 61a3 of the lug groove 61 is disposed. Further, the projecting end of the sipe turning portion 60a3 is disposed further inward in the tire lateral direction than the position in the tire lateral direction of the projecting end of the sipe turning portion 60b3 of the sipe 60b. Thus, reduction in block rigidity of the intermediate block land portion 60 can be suppressed while exerting the edge effect of the sipe 60a. Thus, the wear of the intermediate block land portion 60 is suppressed, and wear resistance and performance on snow can be improved. In addition, the wear of the intermediate block land portion 60 is suppressed, and an increase of wear as compared with other regions is suppressed, and thus uneven wear can be suppressed.

As illustrated in FIGS. 2 and 3, a sipe 60c (third sipe) is preferably disposed in the region sandwiched in the tire circumferential direction by the sipe 60a and the sipe 60b within the region of the intermediate block land portion 60. The sipe 60c preferably extends from the inner circumferential main groove 50 inclining outward in the tire lateral direction with respect to the tire lateral direction being parallel to the inclined sipe portion 60a2 extending from the inner circumferential main groove 50 of the sipe 60a and sipe 60b, and includes a terminating end in the range of the raised bottom portion in the tire lateral direction. The positions in the tire lateral direction of the projecting end of the sipe turning portion 60a3 of the sipe 60a and the projecting end of the sipe turning portion 60b3 of the sipe 60b differ from each other, and thus a space for providing the sipe 60c can be ensured easily in a portion of the intermediate block land portion 60 on the inner circumferential main groove 50 side. Accordingly, an edge effect can further be enhanced.

In addition, as illustrated in FIG. 3, of the inclined sipe portions 60a1 and 60a2, the inclined sipe portion 60a1 that is an outer inclined sipe portion of the sipe 60a extending from the outer circumferential main groove 52 is a portion that extends in a straight line at an incline with respect to the tire lateral direction. At this time, the sipe 60c does not intersect with the inclined sipe portion 60a1, and further does not intersect with a linear extension line that extends the inclined sipe portion 60a1 from the connection ends of the inclined sipe portion 60a1 and the sipe turning portion 60a3. At this time, according to an embodiment, the sipe turning portion 60a3 connected to the inclined sipe portion 60a1 preferably includes a portion that bends or curves opposite to the terminating end side of the sipe 60c with the above-described extension line as a boundary (see region A of FIG. 3). Thus, it is possible to increase the distance between the terminating end of the sipe 60c and the sipe turning portion 60a3 and suppress a reduction in block rigidity, and also to increase the length of the sipe 60a and further increase an edge effect.

According to an embodiment, the position (first position) of the protruding end of the sipe turning portion 60a3 of the sipe 60a in the tire lateral direction, the position (second position) of the projecting end of the sipe turning portion 60b3 of the sipe 60b in the tire lateral direction and the position (third position) of the terminating end of the sipe 60c in the tire lateral direction are preferably within the range of 60% of a width W in the tire lateral direction of the raised bottom portion from the center position in the tire lateral direction of the groove raised bottom portion 61a3 (see FIG. 3). The projecting ends of the sipe turning portions 60*a*3 and 60*b*3 and the terminating end of the sipe 60*c* are provided in this range, and thus a reduction in block rigidity of the intermediate block land portion 60 can be suppressed effectively, and the wear of the intermediate block land portion 60 can be suppressed.

As described above, in the half-tread region at the left of the tire equator line CL illustrated in FIG. 2, a pair of the circumferential main grooves 54 and 56 including the inner circumferential main groove 54 (second inner circumferential main groove) and the outer circumferential main groove 56 (second outer circumferential main groove) disposed outward in the tire lateral direction with respect to the inner circumferential main groove 54, and a land region that is defined by the pair of circumferential main grooves 54 and 56 are disposed. Within the land region, a plurality of the sipes 62*a* and 62*b* that are disposed at intervals in the tire circumferential direction, and extend at an incline in the land region with respect to the tire lateral direction, and that connect the pair of circumferential main grooves 54 and 56 are disposed. Each of the sipes 62*a* and 62*b* includes an inner inclined portion 62*a*1 and 62*b*1, and both-side inclined portions 62*a*2 and 62*b*2. According to an embodiment, the inclination angle of the inner inclined portions 62*a*1 and 62*b*1 with respect to the tire lateral direction is preferably greater than the inclination angle of the both-side inclined portions 62*a*2 and 62*b*2 with respect to the tire lateral direction. The inclination angle of the inner inclined portions 62*a*1 and 62*b*1 is greater than the inclination angle of the both-side inclined portions 62*a*2 and 62*b*2, and thus, since the edge component along the tire circumferential direction increases, the edge effect when cornering on snow can be enhanced. Thus, controllability on snow can be improved.

As described above, in the land region, the lug groove 63 including one end in the tire lateral direction terminating without communicating with the inner circumferential main groove 54 is disposed, and the intermediate continuous land portion 62 that goes around once in the tire circumferential direction is provided. According to an embodiment, the intermediate continuous land portion 62 includes an edge component 62*d* that extends at an incline with respect to the tire lateral direction between the intermediate continuous land portion 62 and the terminating end of the lug groove 63, and the inner inclined portions 62*a*1 and 62*b*1 of the sipes 62*a* and 62*b* are preferably inclined to the same side in the tire circumferential direction as the edge component 62*d* with respect to the tire lateral direction. Thus, the edge component along the tire circumferential direction further increases, and the edge effect when cornering on snow can further be enhanced. Accordingly, the inner inclined portions 62*a*1 and 62*b*1 of the sipes 62*a* and 62*b* and the edge component 62*d* are preferably parallel to each other. In addition, in the region between the two lug grooves 63 adjacent to each other in the tire circumferential direction, the center position of the inner inclined portion 62*a*1 in the tire lateral direction is preferably located further inward in the tire lateral direction than the center position of the edge component 62*d* in the tire lateral direction, and the center position of the inner inclined portion 62*b*1 in the tire lateral direction is preferably further inward in the tire lateral direction than the center position of the inner inclined portion 62*a*1 in the tire lateral direction.

The inclination angle of the inner inclined portions 62*a*1 and 62*b*1 is preferably 45 degrees or greater and less than 90 degrees, and more preferably from 65 to 85 degrees with respect to the tire lateral direction. The inclination angle of the both-side inclined portions 62*a*2 and 62*b*2 is preferably 70 degrees or less, and more preferably from 25 to 50 degrees with respect to the tire lateral direction.

In addition, the inner inclined portion 62*a*1 and the inner inclined portion 62*b*1 are preferably parallel to each other. The inner inclined portion 62*a*1 and the inner inclined portion 62*b*1 are provided parallel to each other, and thus approaching of the separation distance between the sipe 62*a* and the sipe 62*b* can be suppressed. Thus, reduction in the rigidity of the intermediate land portion 62 can be suppressed, and the wear of the intermediate block land portion 60 can be suppressed.

According to an embodiment, the outer circumferential main grooves 52 and 56 are preferably wider than the inner circumferential main grooves 50 and 54. When a tire touches a wet road surface, water on a road surface tends to flow outward from the tire equator line CL in the tire lateral direction. Accordingly, wet performance can be improved by ensuring the groove volume that contributes to drainage properties outward in the tire lateral direction. Accordingly, the groove width of the outer circumferential main grooves 52 and 56 is preferably more than one time and less than twice, and more preferably from 1.1 to 1.4 times the groove width of the inner circumferential main grooves 50 and 54. Note that in a configuration in which the groove widths of the circumferential main grooves 50, 52, 54, and 56 are changed in the tire circumferential direction, "groove width" means the average value of the groove widths measured at a plurality of locations in the tire circumferential direction.

In addition, as illustrated in FIG. 2, one center lug groove 59*b* extending from the inner circumferential main groove 54 and terminating without being connected to the inner circumferential main groove 50 is disposed in a region in the tire circumferential direction that extends from the inner circumferential main groove 50 and that is between two center lug grooves 59*a* adjacent in the tire circumferential direction, and one center lug groove 59*a* extending from the inner circumferential main groove 50 is provided in a region in the tire circumferential direction that extends from the inner circumferential main groove 54 and that is between two second center lug grooves 59*b* adjacent in the tire circumferential direction. Thus, the center continuous land portion 58 that goes around once a tire circumference can be formed, and an edge component can be increased by the lug grooves 59*a* and 59*b* without unevenly distributing block rigidity. Accordingly, performance on snow including control performance on snow can be improved while suppressing the wear of the center continuous land portion 58. In this case, the maximum groove depth of the center lug groove 59*b* is preferably less than the maximum groove depth of the center lug groove 59*a*. As illustrated in FIG. 2, the tread pattern in the half-tread region at the right from the tire equator line CL increases an edge effect by utilizing the sipes and the lug grooves, and improves performance on snow. The groove depth of the center lug groove 59*a* is greater than the groove depth of the center lug groove 59*b*. Accordingly, a significant amount of snow can be trapped in the center lug groove 59*a*, and moreover, the edge effect can be enhanced, and thus performance on snow can be improved.

The pneumatic tire 10 is designated such that one side of both sides in the tire lateral direction is located at a vehicle outer side when the pneumatic tire 10 is mounted on a vehicle. For this designation, information on a mounting outer side or a mounting inner side is displayed as a side pattern in the side portion 10S by using letters, symbols, signs, or the like. In the case of the tread pattern illustrated in FIG. 2, preferably, the side of the half-tread region at the right of the tire equator line CL illustrated in FIG. 2 is designated to be at the vehicle outer side. To improve performance on snow, in the half-tread region at the right of the tire equator line CL illustrated in FIG. 2, an edge effect is enhanced by utilizing the sipes and the lug grooves, and in the half-tread region at the left of the tire equator line CL illustrated in FIG. 2, wear resistance is improved, and the intermediate continuous land portion 62 is disposed as a continuous land portion to improve the edge effect of the inner ring especially when cornering on snow. A vehicle on which tires are mountable are often set to be negative camber, and thus, the negative camber is taken into consideration to improve wear resistance. Accordingly, preferably the tire 10 is mountable on a vehicle such that the half-tread region at the left in FIG. 2 is located at the inner side of the vehicle, and the half-tread region at the right in FIG. 2 is located on the outer side of the vehicle where the ground contact surface easily increases during cornering and braking or accelerating.

EXAMPLE, COMPARATIVE EXAMPLE

To confirm the effect of the tire of the present embodiment, a tire was manufactured by using tread rubber members manufactured by variously changing the composition of a rubber composition, and performance on snow, wet performance, and wear resistance were evaluated. In addition, chipping resistance was evaluated by using rubber members manufactured by variously changing the composition of the rubber composition.

The rubber composition was prepared by kneading components excluding sulfur and a vulcanization accelerator in a 1.8 L sealed mixer for 5 minutes at 160° C., extruding the mixture as a master batch, adding sulfur and a vulcanization accelerator to the master batch, and then kneading the master batch with an open roll. A tire (tire size: 265/50R20 111W) was manufactured by manufacturing an unvulcanized tire in which a tread rubber member made of the obtained rubber composition was disposed in a tread portion, and entirely vulcanizing the unvulcanized tire. In addition, the above-described rubber composition was vulcanized to manufacture a rubber member for evaluation of chipping resistance.

In the manufactured tire, the structure illustrated in FIG. 1 was used. Each of the manufactured tires was mounted on a rim (rim size: 20×8.5J) (air pressure of 250 kPa), and was further mounted on a test vehicle (SUV with engine displacement of 3.6 liter).

Performance on Snow

Each test tire was mounted on a test vehicle, and sensory evaluation was performed for steering characteristics, straightness, and the like when a test driver traveled in the range of 0 to 80 km/hour on a test course of a snow-covered road surfaces. The results are expressed as index values with Comparative Example 1 being assigned the value of 100. Larger index values mean excellent performance on snow.

Wet Performance

Each test tire was mounted on a test vehicle, and sensory evaluation was performed for steering characteristics, straightness, and the like when a test driver traveled in the range of 0 to 80 km/hour on a test course of wet road surfaces with a water depth of 3 mm. The results are expressed as index values with Comparative Example 1 being assigned the value of 100. Larger index values mean excellent wet performance.

Chipping Resistance

A rubber member molded into a cylindrical shape was installed in a rotary test holder, and brought into contact with a drum where protrusions were randomly disposed in outer circumference, and the rubber member was rotated by pressing the rubber member against the drum at a slip rate of 50% and a constant pressure. The number of scratches and the size of the scratches were measured one hour after the start of the test, and the results were expressed by 5-level evaluation with numbers 1 to 5. Larger number means less external damage and excellent chipping resistance.

Wear Resistance

Each test tire was subjected to a wear test to measure the mass of wear by using a Lambourn abrasion tester (available from Iwamoto Seisakusho Co., Ltd.), in accordance with JIS K6264-2:2005 at applied force of 4.0 kg/cm$^3$ (=39 N), a slip ratio of 30%, wear test time of 4 minutes, and room temperature.

The reciprocals of the measured values are expressed as index values with Comparative Example 1 being assigned the value of 100. Larger index values mean a small amount of wear and good wear resistance. When the index value of wear resistance was 101 or greater, wear resistance was evaluated as excellent.

The case where the index values of performance on snow and wet performance are 100 or greater and the sum of the index values is 205 or greater was evaluated that performance on snow and wet performance are improved in a well-balanced manner. In addition to this, the case where the index value of wear resistance is 101 or greater was evaluated that performance on snow and wet performance are excellent and wear resistance is excellent, in other words, performance on snow, wet performance, and wear resistance can be provided in a compatible manner to a high degree.

The results are shown in Tables 1 and 2.

Note that in Tables 1 and 2, the blended amount of each component is expressed by parts by mass with respect to 100 parts by mass of diene rubber. The blended amounts of rubber components are all net blended amounts excluding extender oil.

In Tables 1 and 2, "tan δ (−20)−tan δ (20)/E' (20)" means the above-described {tan δ (−20° C.)−tan δ (20° C.)}/E' (20° C.). This value was calculated by using the tan δ (−20° C.), the tan δ (20° C.), and the storage modulus E' (20° C.) that were determined by measurement results obtained by performing dynamic mechanical analysis for a cured product by applying forced extension vibration in a temperature region from −100° C. to 100° C. at strain of 0.5%, a frequency of 20 Hz, and temperature elevation speed of 2° C./min.

The following components were used as the components shown in Tables 1 and 2.
  E-SBR: KUMHO 1783, available from Korea Kumho Petrochemical Company
  S-SBR1 (modified S-SBR): Nipol NS616, available from ZEON CORPORATION, vinyl unit amount: 65%
  S-SBR2: Nipol NS612, available from ZEON CORPORATION, glass transition temperature Tg: −61° C.
  BR: Butadiene rubber; Nipol BR1220, available from ZEON CORPORATION
  Silica: CTAB: ZEOSIL 1165MP, available from SOLVAY INC, 160 m2/g
  CB: VULCAN 10H, available from Cabot Corporation
  Silane coupling agent: Si69, available from Evonik Degussa Corporation; bis (3-triethoxysilylpropyl)tetrasulfide
  Aroma oil: A/O MIX 2010, available from Sankyo Yuka Kogyo K.K.
  Naphthene oil: Cross L-2000, available from CROSS OIL REFINING & MARKETING, INC.

In addition, the following components were commonly added to the rubber compositions of Comparative Examples and Examples. In addition, a blended amount with respect to 100 parts by mass of diene rubber is expressed by parts by mass.

- 3 parts by mass of flowers of zinc: Zinc Oxide III, available from Seido Chemical Industry Co., Ltd.
- 1.5 parts by mass of sulfur: Golden Flower oil treated sulfur powder, available from Tsurumi Chemical Industry, Co., Ltd.
- 2 parts by mass of vulcanization accelerator: Vulcanization accelerator CBS; NOCCELER CZ-G, available from Ouchi Shinko Chemical Industrial Co., Ltd.

1.0 to 1.3, and the blended amount of silica is 70 parts by mass or greater with respect to 100 parts by mass of the diene rubber.

As can be seen from the comparison between Example 1 and Example 2, wear resistance is improved while wet performance is improved when the blended amount of the filler is 80 parts by mass or greater with respect to 100 parts by mass of the diene rubber.

As can be seen from the comparison between Example 1 and Examples 2 and 3, wear resistance is improved when the CB ratio is 15% or greater.

TABLE 1

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| E-SBR | 70 | 55 | 55 | 45 | 60 |  |  |
| S-SBR1 |  |  |  |  |  | 55 |  |
| S-SBR2 |  |  |  |  |  |  | 55 |
| BR | 30 | 45 | 45 | 55 | 40 | 45 | 45 |
| SBR/BR ratio | 2.3 | 1.2 | 1.2 | 0.8 | 1.5 | 1.2 | 1.2 |
| Silica | 10 | 10 | 50 | 80 | 80 | 80 | 80 |
| CB | 75 | 75 | 35 | 20 | 20 | 20 | 20 |
| CB ratio (%) | 88 | 88 | 41 | 20 | 20 | 20 | 20 |
| Silane coupling agent | 0.8 | 4 | 4 | 6.4 | 6.4 | 6.4 | 6.4 |
| Aroma oil | 30 | 30 | 30 | 30 | 30 | 30 | 30 |
| tanδ (−20) − tanδ (20)/E'(20) | 0.011 | 0.007 | 0.008 | 0.005 | 0.012 | 0.016 | 0.012 |
| Performance on snow | 100 | 101 | 102 | 106 | 103 | 90 | 104 |
| Wet performance | 100 | 92 | 100 | 96 | 98 | 112 | 99 |
| Chipping resistance | 5 | 5 | 5 | 3 | 5 | 3 | 3 |
| Wear resistance | 100 | 112 | 105 | 114 | 100 | 98 | 102 |

TABLE 2

|  | Comparative Example 8 | Example 1 | Example 2 | Example 3 | Example 4 |
|---|---|---|---|---|---|
| E-SBR | 25 | 55 | 55 | 55 | 55 |
| S-SBR1 | 30 |  |  |  |  |
| BR | 45 | 45 | 45 | 45 | 45 |
| SBR/BR ratio | 1.2 | 1.2 | 1.2 | 1.2 | 1.2 |
| Silica | 80 | 80 | 75 | 80 | 80 |
| CB | 20 | 20 |  | 5 | 20 |
| CB ratio (%) | 20 | 20 | 0 | 6 | 20 |
| Silane coupling agent | 6.4 | 6.4 | 6.0 | 6.4 | 6.4 |
| Aroma oil | 30 | 30 | 30 | 30 | 10 |
| Naphthene oil |  |  |  |  | 20 |
| tanδ (−20) − tanδ (20)/E'(20) | 0.013 | 0.008 | 0.009 | 0.009 | 0.007 |
| Performance on snow | 98 | 103 | 104 | 103 | 105 |
| Wet performance | 105 | 105 | 104 | 105 | 106 |
| Chipping resistance | 4 | 5 | 4 | 4 | 5 |
| Wear resistance | 101 | 103 | 101 | 101 | 103 |

As can be seen from the comparison between Example 1 and Comparative Examples 1 to 8, performance on snow, wet performance, and wear resistance can be provided in a compatible manner to a high degree when the blended amount of emulsion-polymerized styrene-butadiene rubber (E-SBR) is 40 parts by mass or greater with respect to 100 parts by mass of the diene rubber, the SBR/BR ratio is from As can be seen from the comparison between Example 1 and Example 4, performance on snow and wet performance are further improved, and performance on snow and wet performance are improved in a well-balanced manner when the blended amount of the naphthene oil is 10 parts by mass or greater with respect to 100 parts by mass of the diene rubber.

Next, to confirm the effect of the tire of the present embodiment due to a difference in a tread pattern, various tread patterns were evaluated for cornering performance on snow and wet performance. Wet performance was evaluated in an identical manner to the evaluation of wet performance described above.

A tire was manufactured by using the tread rubber member used in Example 1. The structure illustrated in FIG. 1 was used in the manufactured tire (tire size: 265/50R20 111W). The manufactured tire was mounted on a rim (rim size: 20×8.5 J) (air pressure: 250 kPa), and was further mounted on a test vehicle (SUV with engine displacement of 3.6 liters) set to a negative camber. With respect to a vehicle mounting orientation, the left half-tread region in FIG. 2 is at a vehicle inner side, and the right half-tread region in FIG. 2 is at a vehicle outer side.

Cornering Performance on Snow

The test vehicle lapped five times on a test course of snow-covered road surfaces having a radius of 7 m at differing speeds, and lateral acceleration was calculated from the lap time of each lap, and the average value of the lateral acceleration was expressed as an index value with Example 6 being assigned the value of 100. A larger index value indicates excellent cornering performance on snow.

The results are shown in Table 3.

Table 3 described below shows the specifications of a tread pattern and the evaluation results of the tread pattern.

Figure 4:
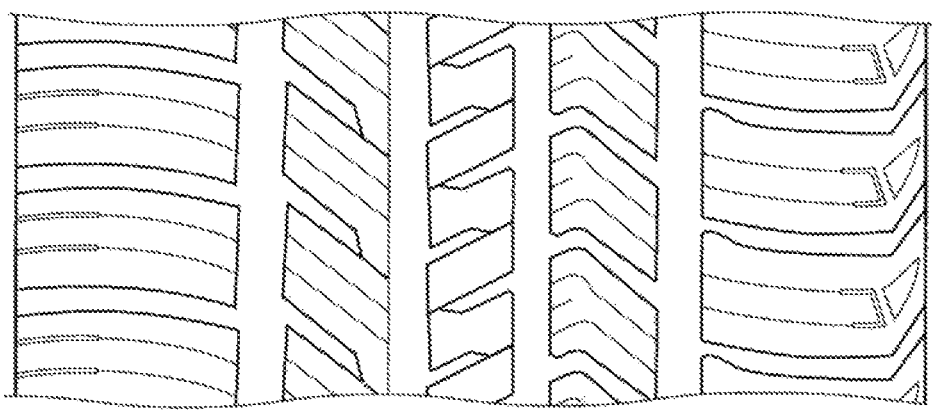
FIG. 4 is a view illustrating a tread pattern of an embodiment used in examples.

FIG. 4 is a view illustrating a tread pattern used in Example 6. In Example 6, the tread pattern illustrated in FIG. 4 was adjusted in accordance with the specifications of "magnitude relationship of groove width" illustrated in Table 3. Unless otherwise specified in Table 3, the groove depth, the groove width, and the sipe depth of grooves and sipes of the tread pattern illustrated in FIG. 4 are the same as the groove depth, the groove width, and the sipe depth illustrated in FIG. 2, in a case where there were corresponding grooves or sipes illustrated in FIG. 2.

In Examples 7 and 8, the tread pattern illustrated in FIG. 2 was used. In Examples 7 and 8, the tread pattern illustrated in FIG. 2 was adjusted according to the specifications of "magnitude relationship of groove width" shown in Table 3.

"Magnitude relationship of groove width" in Table 3 described below means the magnitude relationship between the groove width of the inner circumferential main groove and the groove width of the outer circumferential main groove, "inner<outer" means that the groove width of the outer circumferential main groove is greater, and "inner>outer" means that the groove width of the inner circumferential main groove is greater. Note that in Examples 6 to 8, the groove width of the main groove was adjusted in such a manner that the main groove having a greater groove width of the inner circumferential main groove and the outer circumferential main groove was adjusted to have the width 1.3 times the width of the main groove having a smaller groove width. The groove width was an average value of groove widths measured at a plurality of locations (five or more locations) in the tire circumferential direction.

TABLE 3

|  | Example 6 | Example 7 | Example 8 |
|---|---|---|---|
| Inner inclined portion | No | Yes | Yes |
| Magnitude relationship of groove width | Inner < outer | Inner < outer | Inner > outer |
| Cornering performance on snow | 100 | 102 | 103 |
| Wet performance | 100 | 100 | 98 |

As can be seen from the comparison between Example 6 and Example 7, as for the plurality of sipes disposed within the region defined by a pair of the circumferential main grooves in one half-tread region in such a manner that the plurality of sipes extend at intervals in the tire circumferential direction at an incline with respect to the tire lateral direction, and connect the circumferential main grooves, cornering performance on snow is improved when the inclination angle of the inner inclined portion with respect to the tire lateral direction is greater than the inclination angle of the both-side inclined portions.

As can be seen from the comparison between Example 7 and Example 8, wet performance is improved when the groove width of the outer circumferential main groove is greater than the groove width of the inner circumferential main groove. In addition, it can be seen that cornering performance on snow is improved when the groove width of the inner circumferential main groove is greater than the groove width of the outer circumferential main groove.

The pneumatic tire according to embodiments of the present invention are described above in detail. However, the pneumatic tire according to embodiments of the present invention is not limited to the above-described embodiments or examples and may of course be enhanced or modified in various ways within the scope of the present invention.

What is claimed:

1. A pneumatic tire comprising:
   a tread portion including a rubber composition comprising a diene rubber comprising styrene-butadiene rubber (SBR) and butadiene rubber (BR), and a filler,
   the styrene-butadiene rubber (SBR) comprising emulsion-polymerized styrene-butadiene rubber (E-SBR) having a weight average molecular weight of 500,000 to 1,000,000 in an amount of 40 mass % or greater in the diene rubber,
   a ratio of a blended amount of the styrene-butadiene rubber (SBR) to a blended amount of the butadiene rubber (BR) being from 1.0 to 1.3,
   the filler comprising 70 parts by mass or greater of silica with respect to 100 parts by mass of the diene rubber, and
   an amount of solution-polymerized styrene-butadiene rubber (S-SBR) and natural rubber (NR) in the diene rubber being 0 mass %.

2. The pneumatic tire according to claim 1, wherein the blended amount of the styrene-butadiene rubber (SBR) in the diene rubber is less than or equal to 56.5 mass %.

3. The pneumatic tire according to claim 1, wherein the tread portion comprises a tread pattern in a surface configured to contact with a road surface,
   the tread pattern comprises a pair of circumferential main grooves formed of an inner circumferential main groove disposed in a half-tread region on one side in the tire lateral direction with respect to the tire equator line, and an outer circumferential main groove disposed outward in the tire lateral direction with respect to the inner circumferential main groove, and
   the outer circumferential main groove has a groove width that is greater than a groove width of the inner circumferential main groove.

4. The pneumatic tire according to claim 1, wherein the filler is 80 parts by mass or greater with respect to 100 parts by mass of the diene rubber,
   the filler further comprises carbon black, and
   a ratio of a blended amount of the carbon black to a blended amount of the filler is 15% or greater.

5. The pneumatic tire according to claim 4, wherein the rubber composition comprises 10 parts by mass or greater of naphthene oil with respect to 100 parts by mass of the diene rubber.

6. The pneumatic tire according to claim 4, wherein in the rubber composition, a tan δ (−20° C.) at −20° C. after vulcanization, a tan δ (20° C.) at 20° C. after vulcanization, and a storage modulus E' (20° C.) at 20° C. after vulcanization satisfy {tan δ (−20° C.)−tan δ (20° C.)}/E' (20° C.)<0.01.

7. The pneumatic tire according to claim 4, wherein the tread portion comprises a tread pattern in a surface configured to contact a road surface,
   the tread pattern comprising
   a pair of circumferential main grooves formed of an inner circumferential main groove disposed in a half-tread region on one side in a tire lateral direction with respect to a tire equator line, and an outer circumferential main groove disposed outward in the tire lateral direction with respect to the inner circumferential main groove, and a plurality of sipes disposed at intervals in a tire circumferential direction in regions defined by the pair of circumferential main grooves, the plurality of sipes extending in the regions at an incline with respect to the tire lateral direction, and connecting the pair of circumferential main grooves, each of the plurality of sipes comprising an inner inclined portion, and a both-side inclined portion disposed on both sides of the inner inclined portion in the tire lateral direction, and an inclination angle of the inner inclined portion with respect to the tire lateral direction is greater than an inclination angle of the both-side inclined portion with respect to the tire lateral direction.

8. The pneumatic tire according to claim 4, wherein the tread portion comprises a tread pattern in a surface configured to contact with a road surface, the tread pattern comprises a pair of circumferential main grooves formed of an inner circumferential main groove disposed in a half-tread region on one side in the tire lateral direction with respect to the tire equator line, and an outer circumferential main groove disposed outward in the tire lateral direction with respect to the inner circumferential main groove, and the outer circumferential main groove has a groove width that is greater than a groove width of the inner circumferential main groove.

9. The pneumatic tire according to claim 1, wherein the rubber composition comprises 10 parts by mass or greater of naphthene oil with respect to 100 parts by mass of the diene rubber.

10. The pneumatic tire according to claim 9, wherein in the rubber composition, a tan δ (−20° C.) at −20° C. after vulcanization, a tan δ (20° C.) at 20° C. after vulcanization, and a storage modulus E' (20° C.) at 20° C. after vulcanization satisfy {tan δ (−20° C.)−tan δ (20° C.)}/E' (20° C.)<0.01.

11. The pneumatic tire according to claim 9, wherein the tread portion comprises a tread pattern in a surface configured to contact a road surface, the tread pattern comprising a pair of circumferential main grooves formed of an inner circumferential main groove disposed in a half-tread region on one side in a tire lateral direction with respect to a tire equator line, and an outer circumferential main groove disposed outward in the tire lateral direction with respect to the inner circumferential main groove, and a plurality of sipes disposed at intervals in a tire circumferential direction in regions defined by the pair of circumferential main grooves, the plurality of sipes extending in the regions at an incline with respect to the tire lateral direction, and connecting the pair of circumferential main grooves, each of the plurality of sipes comprising an inner inclined portion, and a both-side inclined portion disposed on both sides of the inner inclined portion in the tire lateral direction, and an inclination angle of the inner inclined portion with respect to the tire lateral direction is greater than an inclination angle of the both-side inclined portion with respect to the tire lateral direction.

12. The pneumatic tire according to claim 9, wherein the tread portion comprises a tread pattern in a surface configured to contact with a road surface, the tread pattern comprises a pair of circumferential main grooves formed of an inner circumferential main groove disposed in a half-tread region on one side in the tire lateral direction with respect to the tire equator line, and an outer circumferential main groove disposed outward in the tire lateral direction with respect to the inner circumferential main groove, and the outer circumferential main groove has a groove width that is greater than a groove width of the inner circumferential main groove.

13. The pneumatic tire according to claim 1, wherein in the rubber composition, a tan δ (−20° C.) at −20° C. after vulcanization, a tan δ (20° C.) at 20° C. after vulcanization, and a storage modulus E' (20° C.) at 20° C. after vulcanization satisfy {tan δ (−20° C.)−tan δ (20° C.)}/E' (20° C.)<0.01.

14. The pneumatic tire according to claim 13, wherein the tread portion comprises a tread pattern in a surface configured to contact a road surface, the tread pattern comprising a pair of circumferential main grooves formed of an inner circumferential main groove disposed in a half-tread region on one side in a tire lateral direction with respect to a tire equator line, and an outer circumferential main groove disposed outward in the tire lateral direction with respect to the inner circumferential main groove, and a plurality of sipes disposed at intervals in a tire circumferential direction in regions defined by the pair of circumferential main grooves, the plurality of sipes extending in the regions at an incline with respect to the tire lateral direction, and connecting the pair of circumferential main grooves, each of the plurality of sipes comprising an inner inclined portion, and a both-side inclined portion disposed on both sides of the inner inclined portion in the tire lateral direction, and an inclination angle of the inner inclined portion with respect to the tire lateral direction is greater than an inclination angle of the both-side inclined portion with respect to the tire lateral direction.

15. The pneumatic tire according to claim 13, wherein the tread portion comprises a tread pattern in a surface configured to contact with a road surface, the tread pattern comprises a pair of circumferential main grooves formed of an inner circumferential main groove disposed in a half-tread region on one side in the tire lateral direction with respect to the tire equator line, and an outer circumferential main groove disposed outward in the tire lateral direction with respect to the inner circumferential main groove, and the outer circumferential main groove has a groove width that is greater than a groove width of the inner circumferential main groove.

16. The pneumatic tire according to claim 1, wherein the tread portion comprises a tread pattern in a surface configured to contact a road surface, the tread pattern comprising a pair of circumferential main grooves formed of an inner circumferential main groove disposed in a half-tread region on one side in a tire lateral direction with respect to a tire equator line, and an outer circumferential main groove disposed outward in the tire lateral direction with respect to the inner circumferential main groove, and a plurality of sipes disposed at intervals in a tire circumferential direction in regions defined by the pair of circumferential main grooves, the plurality of sipes extending in the regions at an incline with respect to the tire lateral direction, and connecting the pair of circumferential main grooves, each of the plurality of sipes comprising an inner inclined portion, and a both-side inclined portion disposed on both sides of the inner inclined portion in the tire lateral direction, and an inclination angle of the inner inclined portion with respect to the tire lateral direction is greater than an inclination angle of the both-side inclined portion with respect to the tire lateral direction.

17. The pneumatic tire according to claim 16, wherein the outer circumferential main groove has a groove width that is greater than a groove width of the inner circumferential main groove.

* * * * *